(12) United States Patent
Bielen et al.

(10) Patent No.: US 11,732,658 B2
(45) Date of Patent: Aug. 22, 2023

(54) FILTER VALVE ASSEMBLY

(71) Applicant: Hamilton Sundstrand Corporation, Charlotte, NC (US)

(72) Inventors: Michal Bielen, Bielawki (PL); Marek Jedlinski, Wroclaw (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/714,838

(22) Filed: Apr. 6, 2022

(65) Prior Publication Data

US 2022/0316409 A1 Oct. 6, 2022

(30) Foreign Application Priority Data

Apr. 6, 2021 (EP) ..................................... 21461533

(51) Int. Cl.
*F02C 9/26* (2006.01)
*F02M 37/32* (2019.01)
*F02C 7/22* (2006.01)

(52) U.S. Cl.
CPC .................. *F02C 9/26* (2013.01); *F02C 7/22* (2013.01); *F02M 37/32* (2019.01)

(58) Field of Classification Search
CPC .. F02C 9/26; F02C 7/22; F02M 37/22; F02M 37/42; F02M 37/36; B01D 29/35;
(Continued)

(56) References Cited

U.S. PATENT DOCUMENTS 2,431,782 A * 12/1947 Matlock ................. B01D 27/10
210/440
2,945,591 A * 7/1960 Pall ....................... B01D 35/147
137/315.01
(Continued)

FOREIGN PATENT DOCUMENTS

DE 10315052 A1 12/2003
DE 102013216840 A1 3/2015
(Continued)

OTHER PUBLICATIONS

Extended European Search Report dated Oct. 8, 2021, issued during the prosecution of European Patent Application No. 21461533.8, 5 pages.

*Primary Examiner* — George C Jin
(74) *Attorney, Agent, or Firm* — Locke Lord LLP; Scott D. Wofsy; Alicia J. Carroll

(57) ABSTRACT

A filter assembly includes a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold. The filter assembly includes a valve assembly mounted inside the manifold, and a by-pass channel defined inside the manifold between the fluid inlet and the fluid outlet. The valve assembly includes a valve body, a by-pass valve system, and a shut off valve system. The by-pass valve system includes a by-pass valve piston having a piston body, and a by-pass valve spring arranged to move the by-pass valve piston. The shut off valve system includes a shut off valve piston, and a shut off valve spring arranged to move the shut off valve piston.

19 Claims, 3 Drawing Sheets

(58) Field of Classification Search
CPC ........ B01D 2201/291; B01D 2201/302; B01D 2201/304; B01D 35/147; B01D 35/153; B01D 35/26
See application file for complete search history.

(56) References Cited

U.S. PATENT DOCUMENTS

| | | | | |
|---|---|---|---|---|
| 2,978,107 | A * | 4/1961 | Gutkowski | .......... B01D 35/147 |
| | | | | 210/235 |
| 4,179,373 | A | 12/1979 | Sablich et al. | |
| 6,997,208 | B2 | 2/2006 | Mack | |
| 2003/0127384 | A1* | 7/2003 | Kapur | .................. B01D 35/147 |
| | | | | 210/416.5 |
| 2004/0182566 | A1* | 9/2004 | Jainek | .................. B01D 35/153 |
| | | | | 165/300 |
| 2019/0381430 | A1* | 12/2019 | Lingen | ................. B01D 29/232 |

FOREIGN PATENT DOCUMENTS

| | | |
|---|---|---|
| DE | 102014010007 A1 | 1/2016 |
| EP | 1350551 B1 | 5/2006 |
| FR | 2979387 A1 | 3/2013 |
| GB | 2162079 A | 1/1986 |
| IT | MI20111315 A1 | 1/2013 |

\* cited by examiner

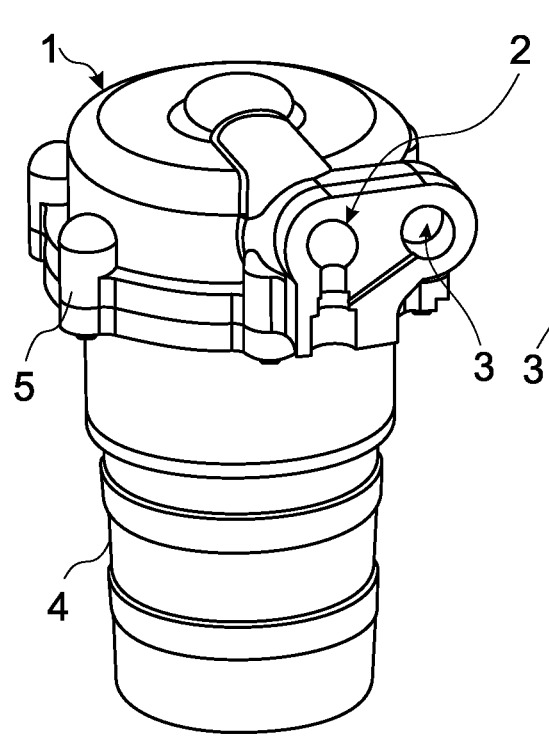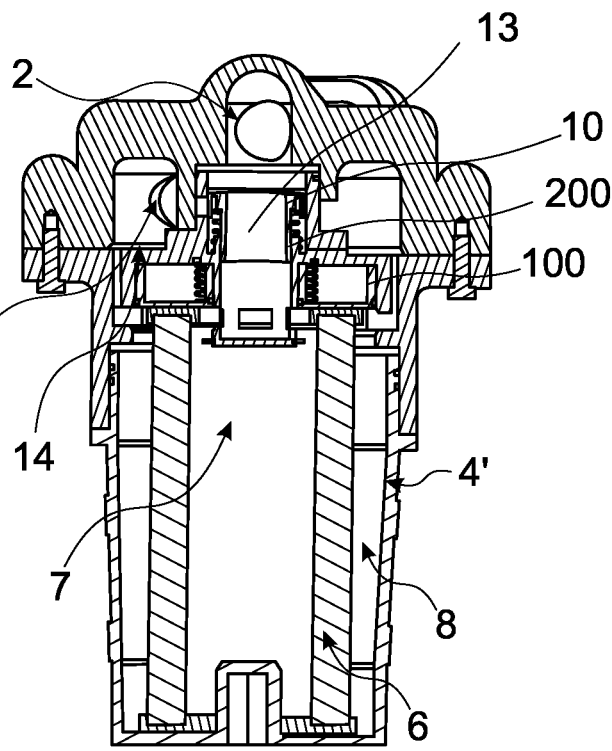
FIG. 1
FIG. 2
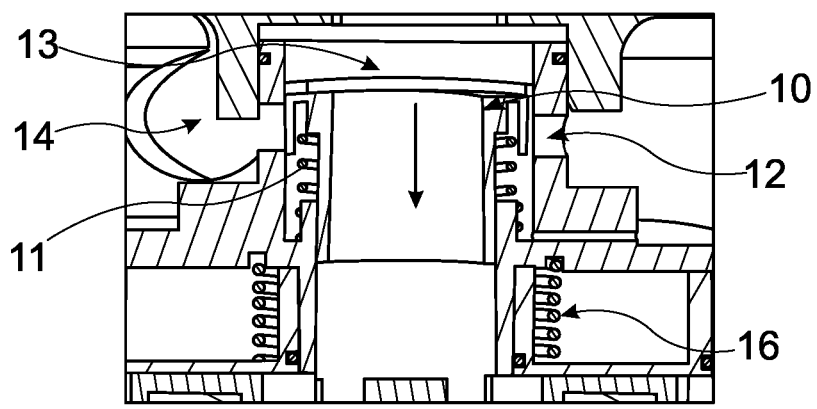
FIG. 3

FILTER VALVE ASSEMBLY

CROSS REFERENCE TO RELATED APPLICATIONS

This application claims priority to European Patent Application No. 21461533.8 filed on Apr. 6, 2021, the entire contents of which are incorporated herein by reference in their entirety.

TECHNICAL FIELD

The present disclosure is concerned with a valve assembly for a filter assembly such as, but not limited to, filters for fuel or oil or lubricant in machines or vehicles, e.g. a fuel filter in a vehicle or an aircraft.

BACKGROUND

Filters are provided in various applications to filter fluid flowing along a fluid flow path in order, for example, to remove particles or contaminants from the fluid. The present disclosure is concerned with the type of filter having a fluid inlet and a fluid outlet and a filter path between the inlet and the outlet, wherein the filter path passes through a filter medium arranged to remove the material to be filtered from the fluid before it arrives at the outlet. Such filters find use in e.g. vehicle fuel systems, where fuel is drawn from a reservoir by a pump and delivered to the engine. Filters are provided in the flow path to remove any particulate matter or debris and to ensure that the fuel reaching the engine is as clean as possible to avoid damage to the engine and permit optimal engine performance. Such filter assemblies may comprise a manifold with an inlet and outlet for connection to the fuel lines and a filter material. This may be provided in a filter cartridge removably attached to the manifold. Filters are also used to filter lubricant fluid e.g. oil and whilst the assembly of the disclosure is described in relation to fuel supply systems, this is by way of example only and the principles may apply equally to filters for lubricant or other fluids. In vehicles, and particularly in aircraft, the effectiveness and reliability of the filters is important for performance, efficiency and safety.

Over time, the filter material may become clogged presenting an impedance to the flow of fluid through the filter. To avoid the engine being cut off from the fuel supply when the filter medium is clogged, most fuel supply systems will provide a way to bypass the filter medium in the event of it becoming clogged since it is important for the engine to receive some fuel, even if it contains debris, rather than no fuel at all. The bypass system will allow fuel to flow to the engine until such time that the filter material can be replaced e.g. by removing and replacing the filter cartridge.

Current filter bypass systems tend to be large and complex and this adds considerably to the cost, weight and size of the filter assembly.

Further, as mentioned above, when the filter medium becomes clogged or has exceeded its useful or permitted life, it needs to be removed and replaced. Conventionally, this requires the fuel system, and therefore the engine, to be switched off while the filter medium is removed, leading to undesirable downtime.

There is a need for a bypass system for a filter assembly that is simple, small and lightweight whilst maintaining reliability. There is also a need for an automatic shut-off system that allows a filter to be removed and replaced without the need to shut-off the entire fuel system and to avoid leakage during removal of the filter cartridge.

SUMMARY

The assembly according to this disclosure is a valve assembly comprising a bypass valve and a shut-off valve that are integrated inside the housing or manifold of a filter assembly and that are automatically actuated.

According to an aspect of the disclosure, there is provided a filter assembly comprising: a manifold having a fluid inlet and a fluid outlet, a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, and a by-pass channel defined inside the manifold between the fluid inlet and the fluid outlet, the valve assembly comprising a valve body and a by-pass valve system and a shut off valve system, wherein the by-pass valve system comprises: a by-pass valve piston having a piston body, and a by-pass valve spring arranged to move the by-pass valve piston, in response to a pressure differential across the filter medium exceeding a predetermined value, from an open position to a by-pass position, wherein in the open position, the by-pass valve spring is biased to hold the by-pass valve piston such that the piston body prevents flow through the by-pass channel and a flow path is defined from the fluid inlet to the inner chamber via the piston, and in the by-pass position, the by-pass valve spring is compressed such that the piston body does not cover the by-pass channel, to provide a fluid flow path from the inlet to the outlet via the by-pass channel; and wherein the shut off valve system comprises: a shut off valve piston, and a shut off valve spring arranged to move the shut off valve piston, in response to removal of the filter housing from the manifold, from an open position to a shut off position, wherein in the open position, a fluid flow path is defined from the fluid inlet to the inner chamber, and in the shut off position the shut off valve spring moves the shut off valve piston to close the fluid flow path from the fluid inlet to the inner chamber and to close off flow to the fluid outlet.

Preferred embodiments of the invention will now be described in more detail, by way of example only, with reference to the drawings.

BRIEF DESCRIPTION OF THE DRAWINGS

FIG. 1 is a perspective view of a filter assembly.

FIG. 2 is a sectional view of a filter assembly as shown in FIG. 1 and in accordance with the disclosure.

FIGS. 3 and 4 show the by-pass system of an assembly according to this disclosure in more detail.

DETAILED DESCRIPTION

Figure 4:
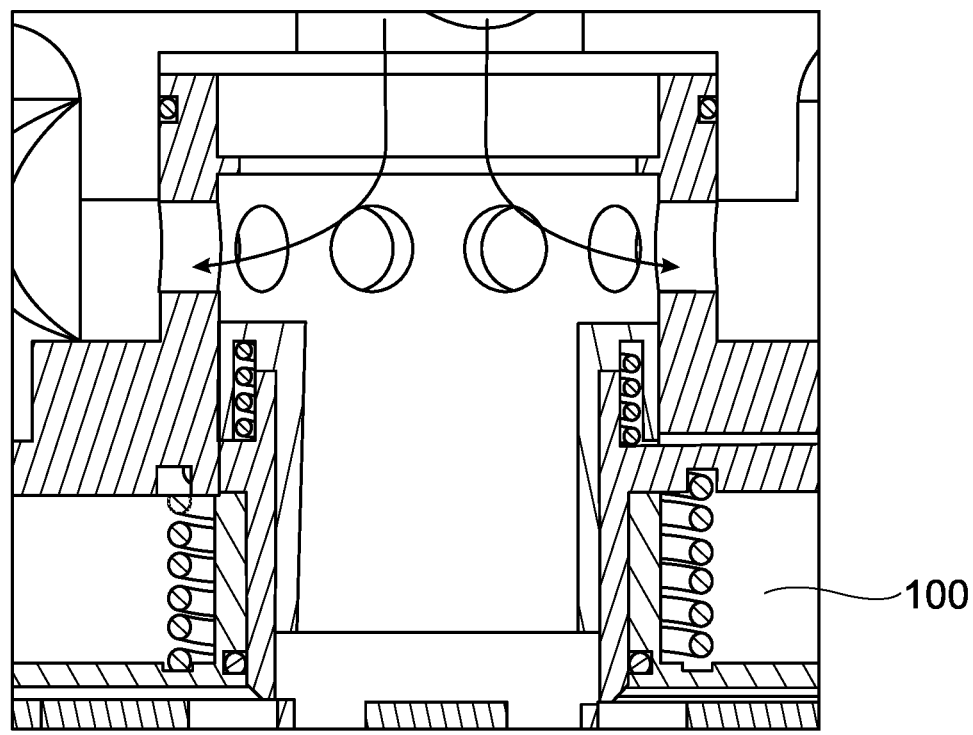

FIG. 1 shows a filter assembly such as those used in fuel systems or the like. Such filters may be placed between the fuel reservoir and the fuel pump and/or between the pump and the engine, to remove debris, particulate matter etc. from the fuel before it reaches the engine. The outer shape and structure of the filter is as is known in the field and is designed to fit in a fuel supply system of the vehicle/aircraft etc. The aim of the present disclosure is to provide a by-pass and shut off system that can be integrated into such a filter assembly without changing the design or the envelope of the exterior of the assembly.

The filter assembly includes a filter manifold 1 having a fluid inlet 2 and a fluid outlet 3. The inlet 2 is configured to be connected to a fluid line from the reservoir or pump (not shown) supplying fluid/fuel to be filtered. The outlet 3 is configured to be connected to a fluid line for providing the filtered fluid to the pump (if the filter is between the reservoir and the pump) or to the engine (if the filter is between the pump and the engine). The manifold 1 is attached to a filter canister or bowl 4 by a connector and/or fasteners 5. As will be described further below with reference to the other drawings, fluid provided to the filter inlet passes from the manifold 1 into the filter canister or bowl 4. The filter bowl 4 contains a filter medium 6 which may be e.g. in the form of a cartridge fitted into the bowl. The filter medium 6 which may be e.g. paper or other known filter material is formed to define an inner chamber 7. An outer chamber 8 is defined between the filter medium 6 and the inner wall 4' of the filter bowl 4. Fluid from the inlet, passing into the filter, is directed into the inner chamber 7. Due to the pressure of the pump and the build-up of pressure in the inner chamber the fluid is forced outwards through the filter medium 6 into the outer chamber 8 and is then forced up to and out from the outlet 3. This is known and standard for such filter assemblies.

As mentioned above, problems can arise when the filter medium 6 becomes clogged or defective such that the fluid in the inner chamber 7 is not able to pass through the filter medium into the outer chamber and to the outlet. The fluid (fuel) would then not reach the engine.

Further, when the filter medium needs replacing, with known assemblies, the fluid supply needs to be cut off to prevent fluid flowing into the inlet so that the bowl 4 can be disconnected from the manifold without fluid leakage, and replaced with new filter medium and reattached before the fluid flow can be re-started.

According to this disclosure, a valve assembly is provided to regulate fluid flow when it cannot pass through the filter medium. The valve assembly is integrated into and inside the manifold of the filter assembly.

The valve assembly includes a by-pass valve system and a shut-off valve system. The valve assembly comprises a valve assembly body 200 defining an inlet chamber 13, the upper part of which is in communication with the inlet 2, and a flow path from the inlet chamber into the inner chamber 7 of the filter. A first, by-pass valve piston 10 is mounted around the upper part of the body 200 and a by-pass valve spring 11 positions the by-pass valve piston 10 relative to the body. The valve assembly further comprises a shut-off valve piston 100 mounted around a lower part of the body 200. The position of the shut-off valve piston relative to the body 200 is regulated by a shut-off valve spring 16. The lower part of the body 200 is provided with openings 21.

The by-pass valve system is configured to allow fluid to flow from the inlet to the outlet, bypassing the filter medium 6, in the event of the filter medium becoming clogged or defective. The shut-off valve system is configured to shut off flow from the fuel system in the event of the filter bowl having to be removed e.g. during maintenance. The fuel inlet and outlet are automatically closed. This avoids any fuel spillage.

The by-pass valve system includes the by-pass valve piston 10, the by-pass valve spring 11, a by-pass channel 12, an inlet chamber 13 and an outlet chamber 14. The by-pass channel 12, provides a fluid flow channel between the inlet chamber and the outlet chamber. The by-pass channel and the inlet chamber 13 and the outlet chamber 14 are defined in the interior of the manifold 1 and the by-pass valve piston 10 is mounted around the valve body that extends from the manifold 1 to the filter bowl 4. The by-pass valve piston 10 is a hollow body defined by a wall. The by-pass valve spring 11 positions the piston 10 relative to the body 200 and relative to the by-pass channel 12.

In normal operation, as shown in FIG. 3, the by-pass valve spring 11 is biased to position the by-pass valve piston 10 relative to the manifold such that the wall of the valve body closes off the by-pass channel 12 to prevent fluid flowing directly from the inlet to the outlet. Fluid from the inlet therefore passes into the inlet chamber and passes along the interior of the hollow piston 10 into the filter inner chamber 7, through the filter medium 6 into the outer chamber 8 from where it is directed to the outlet chamber 14 and out through the outlet, as described above.

If, however, the fluid is unable to pass through the filter medium 6, as shown in FIG. 4, because the filter medium is clogged, the pressure in the inner chamber 7 increases and the pressure drop across the filter medium 6, between the inner and outer chambers, increases. When this pressure difference exceeds a predetermined threshold, a force is generated on the piston 10, at the inlet, which forces the piston against the bias of the by-pass valve spring 11 so as to move the piston relative to the manifold. The piston is moved such that the top edge of the wall is moved past the by-pass channel 12. The by-pass channel is then no longer closed off by the piston wall, thus creating an open flow path from the inlet chamber to the outlet chamber via the by-pass channel, the apertures and the interior of the piston. Fluid therefore flows directly from the inlet to the outlet, bypassing the filter medium/filter bowl. When the pressure difference across the filter medium decreases again, the piston will move, under the force of the by-pass valve spring, back to the default position where the by-pass channel is closed by the piston body and the fluid is then forced again from the inlet chamber into the inner chamber, through the filter medium to the outer chamber and the outlet chamber and out through the outlet.

The by-pass valve spring 11 controls the movement of the piston 10 based on the filter pressure difference, to open the by-pass channel 12 if the pressure difference exceeds the predetermined threshold. The spring itself, however, is not located in the fluid flow path, but, rather, in a 'blind' cavity covered by the piston body. If the spring were in the fluid flow path, the fluid flow could excite the spring and cause resonance in the fluid. A spring in the fluid flow path would also disturb the flow. Further, if the spring were to be damaged, spring material could create debris in the system fluid flow, which could further damage the system.

Figure 6:
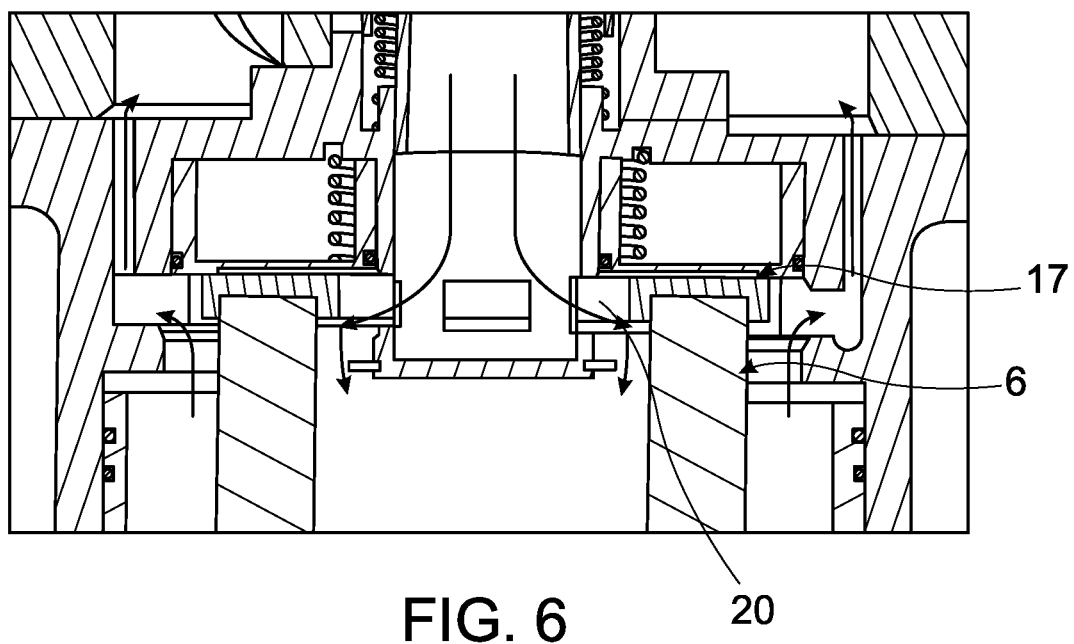

The valve assembly also includes the shut-off valve system comprising the shut-off valve piston 100 and the shut-off valve spring 16 between the shut-off piston 100 and the manifold. Whilst the filter bowl 4 is connected to the manifold, the shut-off spring 16 is compressed by the filter bowl acting against a hard stop such as a retaining ring 18 at the bottom of the piston, to bias the piston 100 to its default or upper position as shown in FIG. 6. In this position the piston 100 is positioned away from the openings 21 and defines a flow channel 22 from the inlet chamber, through the openings 21, through the flow channel 22 and into the inner chamber of the filter medium 6 from where it then flows through the filter medium into the outer chamber.

From the outer chamber, fluid flows out through an outlet slot 15 defined as a groove in the filter housing and exits through the outlet.

Figure 5:
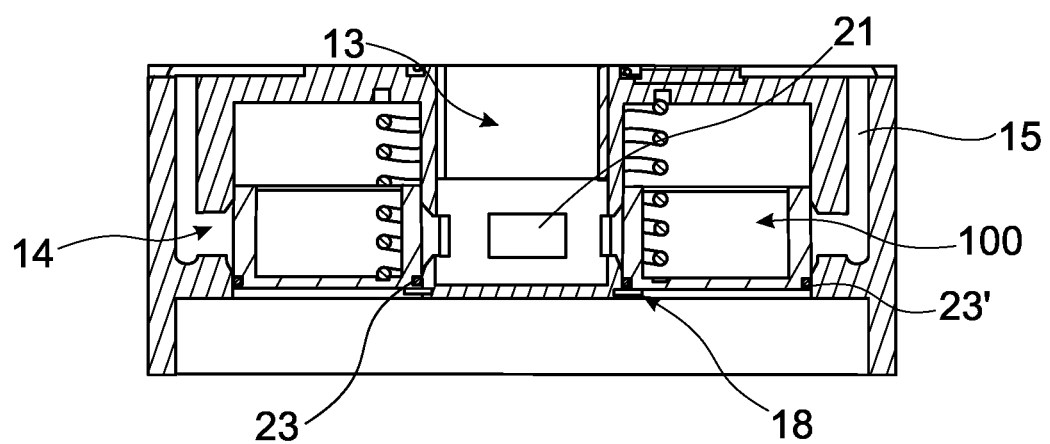
FIGS. 5 and 6 show the shut off system of an assembly according to this disclosure in more detail.

During assembly or disconnection of the filter bowl/cartridge, the shut-off valve system is used to protect the fuel flow. In this case, the shut-off spring 16 is released or expanded due to the filter bowl being removed, causing the piston to move to a lower position as shown in FIG. 5, such that the openings 21 and the outlet slot 15 are covered and closed by the piston body. The bottom of the piston defined by the retaining ring 18 abuts against the filter medium 6 thus closing off the flow channel 22. O-ring seals 23, 23' prevent any leakage. Seals 23 on the outer side of the piston body protect against leakage from the outlet of the manifold. Inner seals 23' protect against leakage from the inlet side. When the filter bowl is reattached, this pushes the shut-off spring 16 back to the upper position to open the flow path again through the filter medium.

In the upper position, the O-ring seals 23, 23' are held in place by the piston body walls so that they cannot fall out and into the fluid flow path. A gasket 17 on the upper surface of the filter medium ensures that there is no leakage between the inner and outer chambers.

As with the by-pass system. The shut off valve spring is not located in the main fluid flow path.

The valve assembly of this disclosure can be located inside existing manifold designs and thus does not increase the envelope of the filter assembly. The valve assembly is relatively simple, small and lightweight and enables simple, quick and less frequent maintenance without fuel loss. Further, the failure of any one valve component will not cause the loss of filter function.

The invention claimed is:

1. A filter assembly comprising:
   a manifold having a fluid inlet and a fluid outlet,
   a filter housing having a filter medium provided therein, the filter medium defining an inner filter chamber and defining an outer filter chamber between the filter medium and the filter housing, the filter housing being removably attached to the manifold so as to provide a fluid flow path from the inlet into the inner filter chamber, through the filter medium into the outer chamber and out of the outlet; characterised by the filter assembly further comprising a valve assembly mounted inside the manifold, and a by-pass channel defined inside the manifold between the fluid inlet and the fluid outlet, the valve assembly comprising a valve body and a by-pass valve system and a shut off valve system,
   wherein the by-pass valve system comprises:
      a by-pass valve piston having a hollow piston body defined by a wall having a top edge and a bottom edge, and
      a by-pass valve spring arranged to move the by-pass valve piston, in response to a pressure differential across the filter medium between the inner filter chamber and the outer filter chamber exceeding a predetermined value, from an open position to a by-pass position, wherein in the open position, the by-pass valve spring is biased to hold the by-pass valve piston such that the piston body blocks flow through the by-pass channel and a flow path is defined from the fluid inlet to the inner chamber via the piston, and in the by-pass position, a force is generated on the piston at the inlet against the bias of the by-pass valve spring and the by-pass valve spring is compressed such that the top edge of the piston body is moved downwards relative to the manifold past the by-pass channel such that the piston body does not cover the by-pass channel, to provide a fluid flow path from the inlet to the outlet via the by-pass channel; and
   wherein the shut off valve system comprises:
      a shut off valve piston, and
      a shut off valve spring arranged to move the shut off valve piston, in response to removal of the filter housing from the manifold, from an open position to a shut off position, wherein in the open position, a fluid flow path is defined from the fluid inlet to the inner chamber, and in the shut off position the shut off valve spring moves the shut off valve piston to close the fluid flow path from the fluid inlet to the inner chamber and to close the flow path to the outlet.

2. The filter assembly of claim 1, wherein the valve assembly valve body defines an inlet chamber, an upper part of which is in fluid communication with the fluid inlet, and a flow path from the inlet chamber into the inner chamber of the filter, wherein the by-pass valve piston is mounted around the upper part of the valve body and the by-pass valve spring positions the by-pass valve piston relative to the valve body.

3. The filter assembly of claim 2, wherein the shut off valve piston is mounted around a lower part of the valve body, and wherein the shut off valve spring positions the shut off valve piston relative to the valve body.

4. The filter assembly of claim 3, wherein the lower part of the valve body is provided with openings.

5. The filter assembly of claim 4, wherein the valve body defines an outlet chamber, the by-pass channel providing a fluid flow channel between the inlet chamber and the outlet chamber.

6. The filter assembly of claim 1, further comprising a hard stop at a bottom of the shut off piston and wherein the shut off spring is compressed when the filter housing acts against the hard stop to bias the shut off valve piston to the open position, and wherein when the filter housing does not act against the biasing ring, the shut off valve spring expands to move the shut off piston to the shut off position.

7. The filter assembly of claim 6, wherein the hard stop is a retaining ring.

8. The filter assembly of claim 7, further comprising at least one of an o-ring seal or a gasket to prevent leakage between chambers of the assembly.

9. The filter assembly of claim 8, wherein at least one of the o-ring seal or the gasket are separated from the fluid.

10. The filter assembly of claim 8, wherein the by-pass valve spring and the shut off valve spring are separated from the fluid.

11. The filter assembly of claim 10, wherein at least one of the o-ring seal or the gasket are separated from the fluid.

12. The filter assembly of claim 1, further comprising at least one of an o-ring seal or a gasket to prevent leakage between chambers of the assembly.

13. The filter assembly of claim 1, wherein the by-pass valve spring and the shut off valve spring are separated from the fluid.

14. The filter assembly of claim 1, further comprising seal means to prevent leakage between chambers of the assembly.

15. The filter assembly of claim 14, wherein the seal means are separated from the fluid.

16. The filter assembly of claim 1, further comprising an outlet slot formed in the housing to provide a fluid flow channel from the outer chamber to the fluid outlet, the outlet slot being closed off by the shut off valve piston in the shut off position.

17. The filter assembly of claim 2, wherein the valve body defines an outlet chamber, the by-pass channel providing a fluid flow channel between the inlet chamber and the outlet chamber.

18. The filter assembly of claim 3, wherein the valve body defines an outlet chamber, the by-pass channel providing a fluid flow channel between the inlet chamber and the outlet chamber.

19. A method of controlling the flow of fluid through a filter assembly, the method comprising:
  causing fluid to flow from an inlet to an outlet of a manifold via a filter medium until a pressure across the filter medium, between an inner filter chamber and an outer filter chamber, exceeds a given value;
  actuating a by-pass valve assembly to cause fluid to flow from the inlet to the outlet via a by-pass channel bypassing the filter medium, wherein the by-pass valve assembly includes a by-pass valve piston having a hollow piston body defined by a wall having a top edge and a bottom edge, wherein actuating the by-pass valve assembly includes generating a force on the by-pass valve piston at the inlet against the bias of a by-pass valve spring and the by-pass valve spring is compressed such that the top edge of the piston body is moved downwards relative to the manifold past the by-pass channel such that the piston body does not cover the by-pass channel, to provide a fluid flow path from the inlet to the outlet via the by-pass channel; and;
  actuating a shut off valve assembly in the event of removal of the filter medium from the assembly, to provide a shut-off flow path between the inlet and outlet.

* * * * *